(12) United States Patent
Hajbi

(10) Patent No.: US 9,890,875 B2
(45) Date of Patent: Feb. 13, 2018

(54) FLUID DEVICE HOUSING

(71) Applicant: Iehezkel Hajbi, Nir Israel (IL)

(72) Inventor: Iehezkel Hajbi, Nir Israel (IL)

(73) Assignee: A.R.I. Fluid Control Accessories Ltd., Kfar Charuv (IL)

( * ) Notice: Subject to any disclaimer, the term of this patent is extended or adjusted under 35 U.S.C. 154(b) by 0 days.

(21) Appl. No.: 14/850,975

(22) Filed: Sep. 11, 2015

(65) Prior Publication Data

US 2017/0074415 A1    Mar. 16, 2017

(51) Int. Cl.
  *F16L 1/00*    (2006.01)
  *F16K 27/12*   (2006.01)
  *G01F 15/00*   (2006.01)

(52) U.S. Cl.
  CPC .............. *F16L 1/00* (2013.01); *F16K 27/12* (2013.01); *G01F 15/006* (2013.01)

(58) Field of Classification Search
  CPC ............................ F16K 27/003; F16K 27/00
  USPC .......... 285/91, 330, 403, 404, 913; 403/292, 403/293, 294, 341, 300, 303, 308, 314
  See application file for complete search history.

(56) References Cited

U.S. PATENT DOCUMENTS

| | | | | | |
|---|---|---|---|---|---|
| 3,272,537 | A | * | 9/1966 | Bellatorre | F16L 21/08 285/123.16 |
| 5,188,399 | A | * | 2/1993 | Durina | F16L 37/252 285/148.26 |
| 5,333,911 | A | * | 8/1994 | Watkins | E21B 17/046 285/18 |
| 5,351,999 | A | * | 10/1994 | Hattori | F16L 25/065 285/369 |
| 7,025,385 | B2 | * | 4/2006 | Drescher | F16L 37/252 285/330 |
| 7,044,507 | B2 | * | 5/2006 | Ricard | F16L 37/113 285/330 |
| 7,530,607 | B2 | * | 5/2009 | Luft | F16B 7/0406 285/402 |
| 8,147,162 | B1 | * | 4/2012 | Burnett | F16B 5/0052 312/263 |
| 2012/0000060 | A1 | * | 1/2012 | Cameron | F16B 5/0044 29/525.01 |

* cited by examiner

*Primary Examiner* — John K Fristoe, Jr.
*Assistant Examiner* — Josephine Trinidad-Borges
(74) *Attorney, Agent, or Firm* — Dekel Patent Ltd.; David Klein

(57) ABSTRACT

A fluid device housing includes a lower fluid device housing portion and an upper fluid device housing portion each formed with mating members. Each of the mating members of the lower fluid device housing portion mate with a corresponding mating member of the upper fluid device housing portion to form an inclined channel. A connector member is arranged to fit at least partially around peripheries of the lower and upper fluid device housing portions. The connector member includes lugs that are received in the inclined channels.

12 Claims, 4 Drawing Sheets

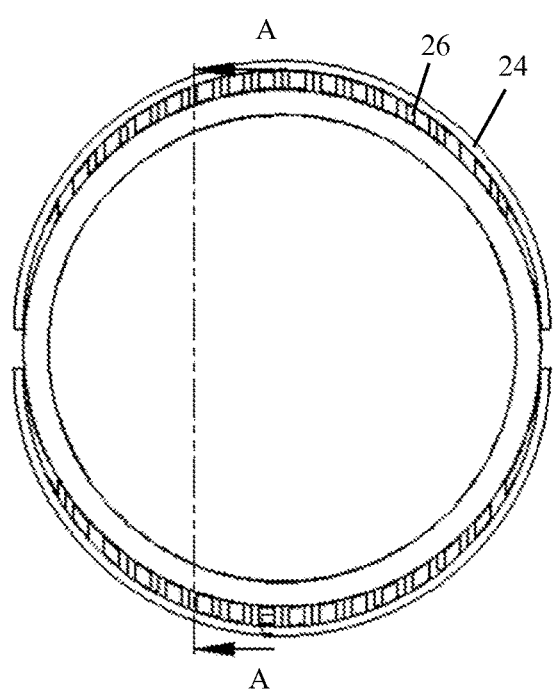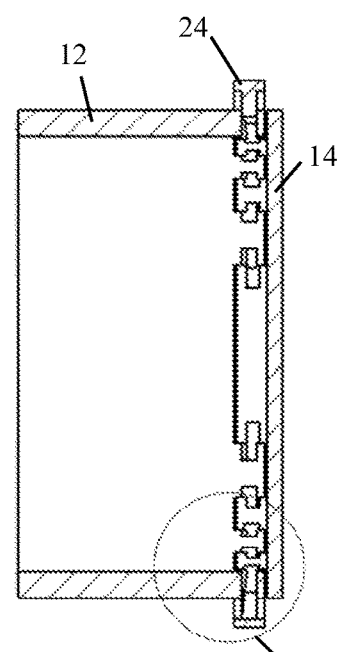
FIG. 3
FIG. 4

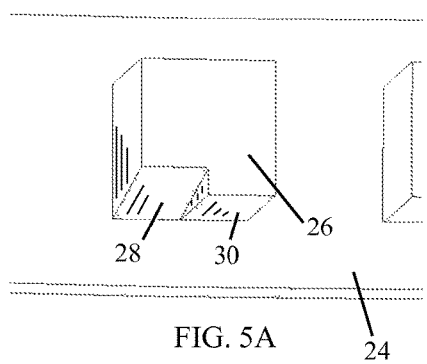
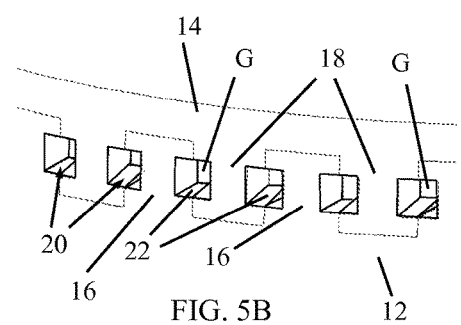
FIG. 5A
FIG. 5B
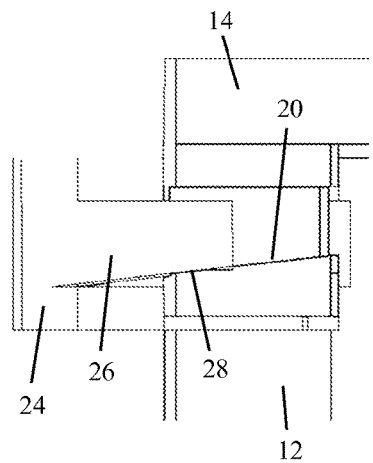
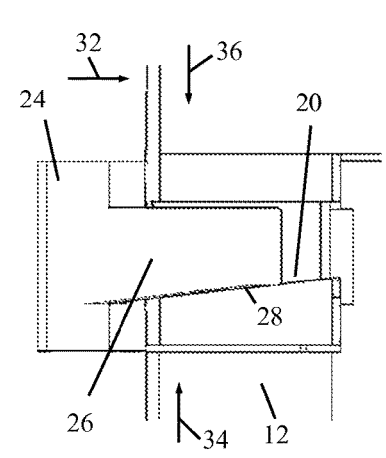
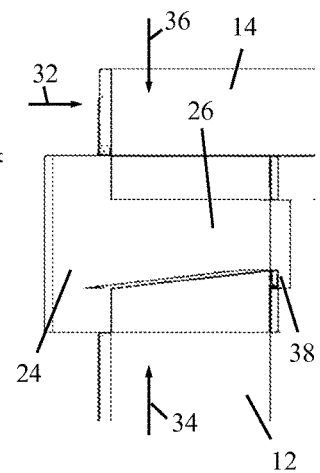
FIG. 5C
FIG. 5D
FIG. 5E

FLUID DEVICE HOUSING

FIELD OF THE INVENTION

The present invention relates generally to fluid device housings, such as plastic housings for hydraulic valves, water meters and the like.

BACKGROUND OF THE INVENTION

Hydraulic valves with plastic housings are known. The housing can be made by injection molding, which permits the production of large numbers at a high accuracy. However, securing two plastic parts of the housing together to withstand forces is a challenge.

Water meters are also known with plastic housings. The trend with water meters is towards the use of plastic meters, as opposed to metal meters. One reason for this trend is that many jurisdictions now require zero lead content in the water supply and accordingly, meters in contact with the water supply also need to have zero lead content. Plastic meters satisfy this zero lead content requirement.

U.S. Pat. No. 8,353,208 describes a water meter having a two-part plastic housing. The housing has an upper housing part and lower housing part, which are connected with a plurality of comb-like retaining columns. The retaining columns at the upper housing part or lower housing part are shaped complementary to one another and mate together so that the housing parts can be plugged together. The retaining columns are oriented in the direction in which the tensile force between the upper housing part and lower housing part is directed, when the housing is subjected to internal pressure. Retaining grooves, which are oriented transverse to the effective direction of the tensile force, are formed in two opposite surfaces of the retaining columns. Retaining bolts, which at least partially touch the surfaces formed by the retaining grooves, can be inserted in the retaining grooves. The comb-shaped retaining columns are subjected only to tension and not to bending. The retaining bolts are subjected only to shearing.

SUMMARY OF THE INVENTION

The present invention seeks to provide an improved housing for a fluid device, such as a hydraulic valve or water meter and the like, as described more in detail hereinbelow. The invention is applicable in many systems, such as irrigations systems, domestic and industrial utilities and general water supply systems, among others.

There is thus provided in accordance with a non-limiting embodiment of the present invention a fluid device housing including a lower fluid device housing portion and an upper fluid device housing portion each formed with mating members, each of the mating members of the lower fluid device housing portion mating with a corresponding mating member of the upper fluid device housing portion to form an inclined channel, and a connector member arranged to fit at least partially around peripheries of the lower and upper fluid device housing portions, the connector member including lugs that are received in the inclined channels.

In accordance with a non-limiting embodiment of the present invention each of the lugs includes a wedge surface arranged to slide across and wedge against the inclined channel.

In accordance with a non-limiting embodiment of the present invention the wedge surface is arranged with respect to the inclined channel such that as the wedge surface wedges against the inclined channel, the lower and upper fluid device housing portions are forced against each other.

In accordance with a non-limiting embodiment of the present invention an appendage extends from an end of the wedge surface. When the wedge surface is fully received in the inclined channel, the appendage passes over an inner edge of the inclined channel and faces against an inner perimeter of one of the lower and upper fluid device housing portions.

In accordance with a non-limiting embodiment of the present invention the mating members include projections extending from one of the lower and upper fluid device housing portions that project into openings formed in the opposite one of the fluid device housing portions. Each of the projections does not completely fill the opening so as to leave a gap in the opening, and each of the projections includes an inclined surface aligned with the gap so as to form the inclined channel.

In accordance with a non-limiting embodiment of the present invention at least one of the lugs includes a non-wedge surface next to the wedge surface. The inclined channel can include straight surfaces, one or more curved surfaces or any combination thereof. The projections can have an I-beam shape and the openings can have a plus-sign shape.

In accordance with a non-limiting embodiment of the present invention the connector member includes two halves, each half fitting around half of the peripheries of the lower and upper fluid device housing portions.

BRIEF DESCRIPTION OF THE DRAWINGS

The present invention will be understood and appreciated more fully from the following detailed description taken in conjunction with the drawings in which:

FIG. 3 is a simplified top view illustration of the fluid device housing

FIG. 4 is a simplified sectional illustration of the fluid device housing, taken along lines A-A in FIG. 3;

FIG. 5A is a simplified illustration of a portion of a connector member for connecting the lower and upper fluid device housing portions together;

FIG. 5B is a simplified illustration of the lower and upper fluid device housing portions mated together to form inclined channels;

FIGS. 5C-5E are simplified illustrations of inserting connector members into the inclined channels of the fluid device housing;

DETAILED DESCRIPTION OF EMBODIMENTS

Figure 1:
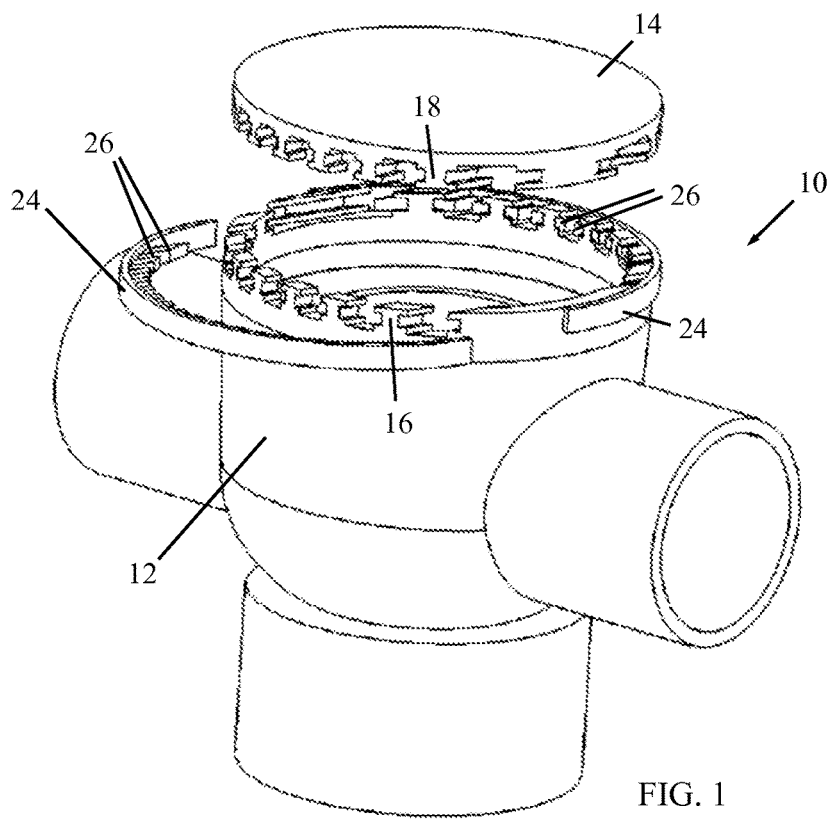
FIG. 1 is a simplified exploded illustration of a fluid device housing, constructed and operative in accordance with an embodiment of the present invention.
Figure 2:
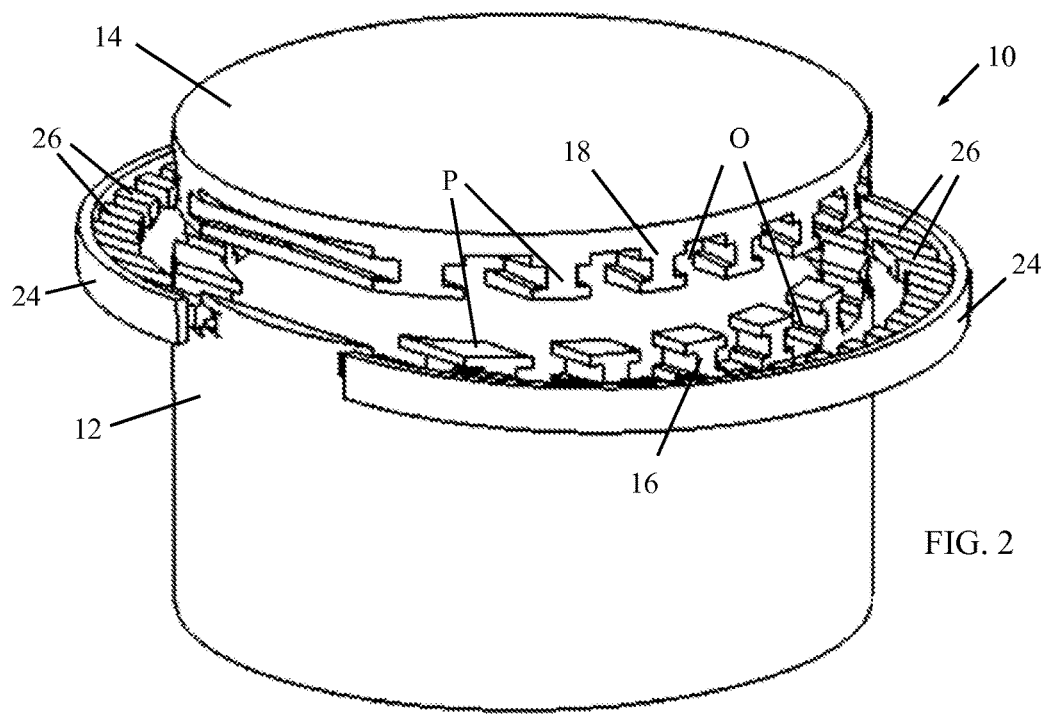
FIG. 2 is a more-detailed exploded illustration of the fluid device housing.

Reference is now made to FIGS. 1 and 2, which illustrate a fluid device housing 10, constructed and operative in accordance with a non-limiting embodiment of the present invention.

Fluid device housing 10 includes a lower fluid device housing portion 12 and an upper fluid device housing portion 14 each formed with mating members 16 and 18, respectively. Each mating member 16 of the lower fluid device housing portion 12 mates with a corresponding mating member 18 of the upper fluid device housing portion 14 to form an inclined channel 20.

In the illustrated embodiment, the mating members 16 of the lower fluid device housing portion 12 include projections P having an I-beam shape that extend upwards and which are separated from each other by an opening O that has a plus-sign shape. Likewise, the mating members 18 of the upper fluid device housing portion 14 include projections P having an I-beam shape that extend downwards and which are separated from each other by an opening O that has a plus-sign shape. The projections P from the lower fluid device housing portion 12 project into the openings O of the upper fluid device housing portion 14. Likewise, the projections P from the upper fluid device housing portion 14 project into the openings O of the lower fluid device housing portion 12. Each of the projections does not completely fill the opening so as to leave a gap G in the opening (seen in FIG. 5B). As seen in FIG. 5B, each of the projections includes an inclined surface 22 aligned with the gap G so as to form the inclined channel 20.

A connector member 24 is arranged to fit at least partially around peripheries of the lower and upper fluid device housing portions 12 and 14, respectively. In the illustrated embodiment of FIGS. 1 and 2, the connector member 24 includes two halves, each half fitting around half of the peripheries of the lower and upper fluid device housing portions. (As seen in the drawings, the term "half" encompasses a member that subtends an arch of not just 180° but also less than 180°.)

Connector member 24 includes lugs 26 that are received in the inclined channels 20 (as described further below with reference to FIGS. 5C-5E). As seen in FIG. 5A, each lug 26 includes a wedge surface 28. In the illustrated embodiment of FIG. 5A, at least one of the lugs 26 includes a non-wedge surface 30 next to the wedge surface 28.

The mating members may be parallel to each other, as well as the corresponding lugs. Alternatively, the mating members may point radially inwards to the center of the cylindrical fluid device housing, as well as the corresponding lugs.

Reference is now made to FIGS. 5C-5E. FIG. 5C shows the lug 26 at the beginning of insertion into inclined channel 20. Wedge surface 28 is arranged with respect to inclined channel 20 such that as wedge surface 28 wedges against inclined channel 20 (by moving connector member 24 inwards in the direction of an arrow 32), the lower and upper fluid device housing portions 12 and 14 are forced against each other (in the direction of arrows 34 and 36, respectively).

In accordance with a non-limiting embodiment of the present invention, an appendage 38 extends from an end of the wedge surface 28. When the wedge surface 28 is fully received in the inclined channel 20 (FIG. 5E), the appendage 38 passes over an inner edge of the inclined channel 20 and faces against an inner perimeter of one of the lower and upper fluid device housing portions 12 or 14. Thus, appendage 38 "clicks" over the inclined channel 20 for positively locking lugs 26 in inclined channels 20.

Figure 6:
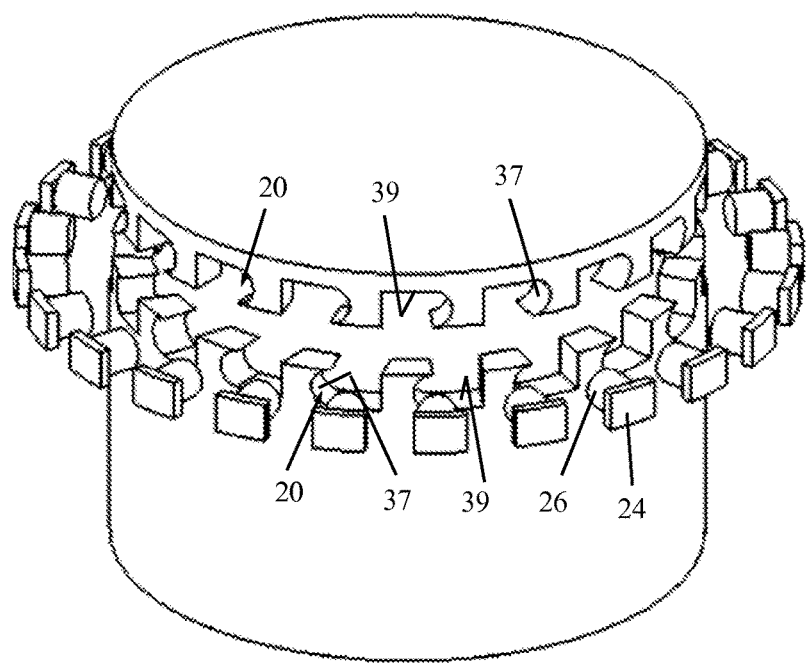
FIG. 6 is a simplified exploded illustration of a fluid device housing, constructed and operative in accordance with another embodiment of the present invention, having curved inclined channels.

In the embodiment of FIG. 1, inclined channel 20 has straight surfaces. Reference is now made to FIG. 6, which illustrates another embodiment in which the inclined channels 20 have one or more curved surfaces (side surfaces) 37 combined with upper and lower straight surfaces 39. Individual connector members 24 with lugs 26 are inserted in the inclined channels.

Figure 7:
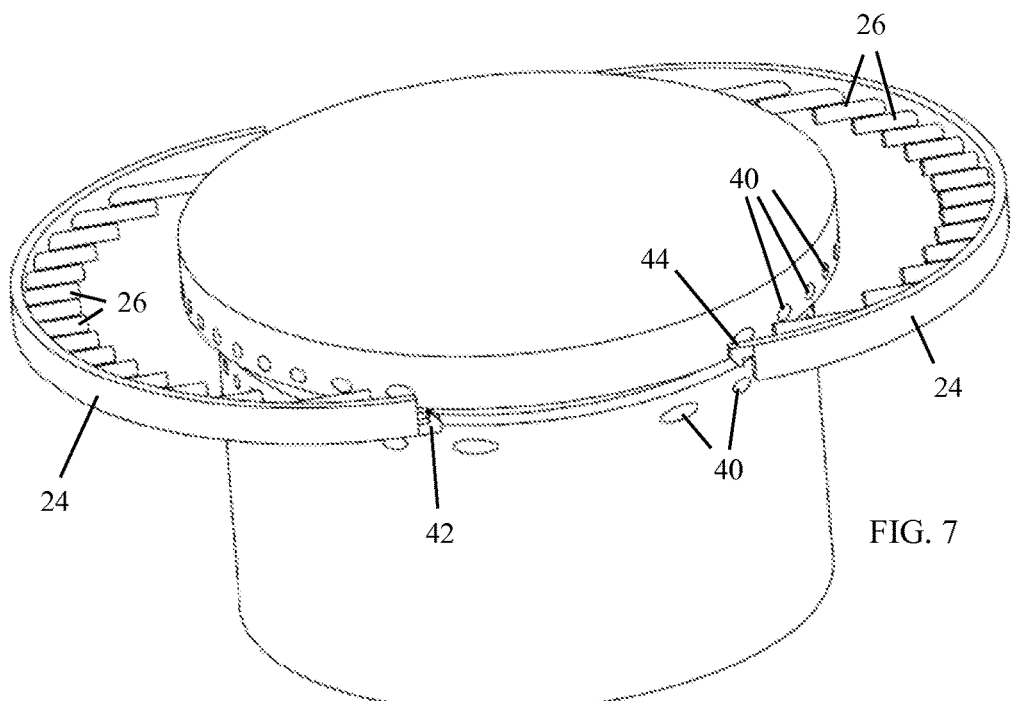
FIG. 7 is a simplified exploded illustration of a fluid device housing, constructed and operative in accordance with another embodiment of the present invention, having round inclined channels.

Reference is now made to FIG. 7, which illustrates yet another type of inclined channel, that of a completely round inclined channels. The lower and upper fluid device housing portions area each formed with circular or elliptical openings 40 which are aligned with each other when the housing portions are closed together. Openings 40 are formed with inclined surfaces to form the inclined channels. Connector member 24 includes round lugs 26 that wedge in the inclined channels. The two halves of the connector member 24 include appendages 42 and 44 that attach together when the connector halves are fully inserted in the inclined channels.

What is claimed is:

1. A fluid device housing comprising:
   a lower fluid device housing portion and an upper fluid device housing portion each formed with mating members, each of said mating members of said lower fluid device housing portion mating with a corresponding mating member of said upper fluid device housing portion to form an inclined channel, wherein said inclined channel is inclined along a radial direction defined between outer circumferences of said fluid device housing portions and centers of said fluid device housing portions, such that an outer end of said inclined channel near the outer circumferences of said fluid device housing portions is axially lower than an inner end of said inclined channel opposite to said outer end and closer to the centers of said fluid device housing portions, and said inclined channel is gradually inclined from the outer end to the inner end; and
   a connector member arranged to fit at least partially around peripheries of said lower and upper fluid device housing portions, said connector member comprising lugs that are received in said inclined channels.

2. The fluid device housing according to claim 1, wherein each of said lugs comprises a wedge surface arranged to slide across and wedge against said inclined channel.

3. The fluid device housing according to claim 2, wherein said wedge surface is arranged with respect to said inclined channel such that as said wedge surface wedges against said inclined channel, said lower and upper fluid device housing portions are forced against each other.

4. The fluid device housing according to claim 2, further comprising an appendage extending from an end of said wedge surface, wherein when said wedge surface is fully received in said inclined channel, said appendage passes over an inner edge of said inclined channel and faces against an inner perimeter of one of said lower and upper fluid device housing portions.

5. The fluid device housing according to claim 1, wherein said mating members comprise projections extending from one of said lower and upper fluid device housing portions that project into openings formed in the opposite one of the fluid device housing portions, wherein each of said projections does not completely fill said opening so as to leave a gap in said opening, and each of said projections comprises an inclined surface aligned with said gap so as to form said inclined channel.

6. The fluid device housing according to claim 1, wherein at least one of said lugs comprises a non-wedge surface next to said wedge surface.

7. The fluid device housing according to claim 1, wherein said inclined channel comprises straight surfaces.

8. The fluid device housing according to claim 1, wherein said inclined channel comprises a curved surface.

9. The fluid device housing according to claim 5, wherein said projections have an I-beam shape.

10. The fluid device housing according to claim 5, wherein said openings have a plus-sign shape.

11. The fluid device housing according to claim 1, wherein said connector member comprises two halves, each half fitting around half of the peripheries of said lower and upper fluid device housing portions.

12. The fluid device housing according to claim 4, wherein each of said inclined channels, said appendage clicks over said inclined channel for positively locking said lug in said inclined channel.

* * * * *